June 21, 1938. V. J. CRISLER ET AL 2,121,188
FIXTURE FOR FILING ARTICLES
Filed June 29, 1936
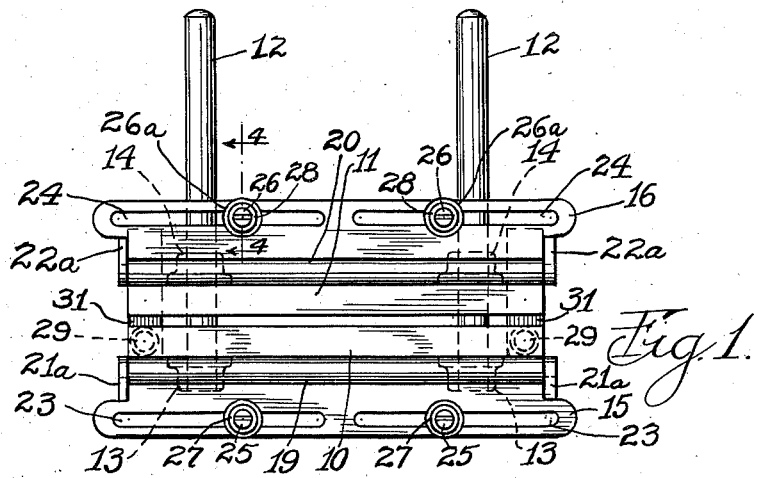
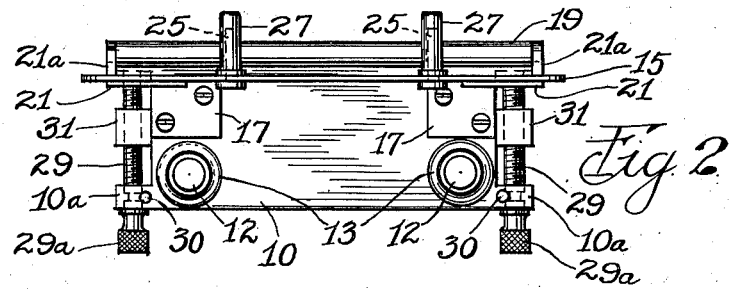
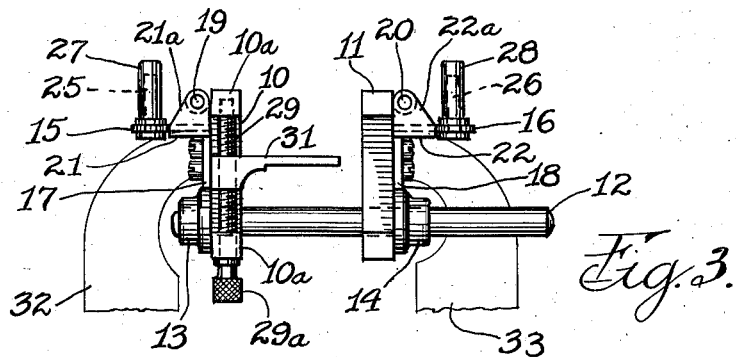
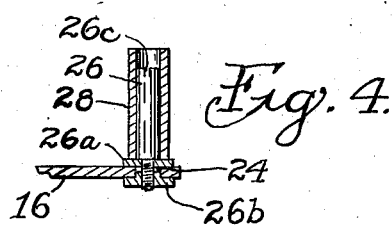
INVENTORS
VERN J. CRISLER
WALTER J. FRIEDLAND
BY Albert C. Bell
ATTORNEY.

Patented June 21, 1938

2,121,188

UNITED STATES PATENT OFFICE 2,121,188

FIXTURE FOR FILING ARTICLES

Vern J. Crisler and Walter J. Friedland, Chicago, Ill.

Application June 29, 1936, Serial No. 87,823

11 Claims. (Cl. 29—76)

Our invention consists of an attachment for use with machinists' vises or the like, for securely holding articles to which it is desired to impart accurately finished plane surfaces at exact angles to each other, by filing or similar hand operations.

More specifically, our invention consists of a pair of parallel clamping bars for engagement with and operation by the jaws of a vise or other clamp, slide rods connecting said clamping bars and holding them in parallel relation for movement towards and from each other, adjustable rests for supporting the work at different desired elevations between said clamping bars, first and horizontally disposed hardened rollers for supporting a file or the like with its lower surface perpendicular to the adjacent vertical clamping faces of the clamping bars, and second and vertically disposed hardened rollers for engaging the cutting surface of a file or the like and giving the plane of said surface a position or positions perpendicular to a plane tangent with the tops of said first rollers, said second rollers having adjustable supports movable longitudinally of said clamping bars giving said cutting surface a desired horizontal angle or angles, whether right, acute or obtuse, with the clamping faces of said clamping bars.

By the use of the filing fixture described, bars or articles of metal or other material may have plane surfaces filed or otherwise finished upon them by hand operations, which are flat and true, some of which may be accurately parallel and accurately spaced from each other, others of which surfaces may be accurately disposed at desired angles to each other, and all without requiring previous experience or skill on the part of the workman. Furthermore, duplicate parts may be accurately made by the filing fixture described.

In using our filing fixture, where the surfaces produced do not require a high degree of finish or polish, they may be made by ordinary machinists' files; where, however, it is desired to produce surfaces of high finish and accuracy, emery, carborundum, or other abrasive blocks or hones of coarse or fine grit as required, may be used to make or finish said surfaces. For convenience, in the following description and claims, where reference is made to files as the tools used in making said surfaces, we include within the meaning of that term all hand tools, hones, abrasive blocks and the like, that can be used with our fixture to produce the described surfaces on the work by cutting and abrading; and where reference is made to said surfaces as filed surfaces, we include within the meaning of that term any and all surfaces produced on the work by the use of our fixture, by cutting and abrading hand tools of any and all kinds adapted to the purpose.

Our invention will be best understood by reference to the accompanying drawing illustrating a preferred embodiment thereof, in which Fig. 1 shows our fixture in plan view, Fig. 2 shows our fixture in front elevation, Fig. 3 shows our fixture in end elevation, and Fig. 4 is a vertical, sectional view of a part of the structure shown in Fig. 1, taken along the line 4—4.

Similar numerals refer to similar parts throughout the several views.

As shown in Fig. 1, our fixture consists of iron or steel clamping bars 10 and 11 having adjacent work engaging faces held in parallel relation by metal guide rods 12, 12 rigidly secured in bosses 13, 13 extending from the clamping bar 10, and having sliding fits in bosses 14, 14 extending from the clamping bar 11, said rods being perpendicular to the work engaging faces of said clamping bars. As a result, the clamping bar 11 may be moved on the rods 12, 12 to bring said work engaging faces into engagement with each other and to separate said faces to receive between them any desired work to be filed, within the capacity of the fixture.

As shown in Figs. 2 and 3, the clamping bars 10 and 11 have extending horizontally therefrom and away from the clamping faces thereof, metal plates 15 and 16 respectively, secured to said bars by angle members 17 and 18. The plates 15 and 16 are preferably in the same horizontal plane and parallel with the top edge faces of the bars 10 and 11. Rollers 19 and 20 are supported in horizontal position adjacent and outside of the upper portions of the bars 10 and 11, with their uppermost elements in a plane perpendicular to the clamping faces of the bars 10 and 11, and just above and preferably parallel with the top edge faces of said bars, said rollers being supported by metal angle members 21 and 22 secured to the plates 15 and 16 respectively, and having upwardly extending legs 21a and 22a into which the roller journal portions of reduced diameter, extend with a free turning fit.

As a result of the relation of the rollers 19 and 20 to the clamping faces of the bars 10 and 11 above described, when a piece of work to be filed is clamped between the bars 10 and 11, with its upper portion projecting above the rollers 19 and 20, and said work is filed until the file rides on the rollers 19 and 20 and will remove no more material from said work, the filed surface is true and flat and at right angles to the clamping faces of the bars 10 and 11. The piece of work may then be removed and again clamped between said bars with said filed surface engaging the clamping face of one of said bars, and a second true and flat surface can be similarly filed on said work, at a right angle to said first filed surface, and the procedure may be continued until four true and flat surfaces are filed on said piece of work, adjacent ones of said surfaces being at right angles to each other and opposite ones of said surfaces being parallel with each other. By differently clamping the piece of work between said bars, similar surfaces may be filed on said material at angles other than right angles to each other.

Our filing fixture is provided with additional filing guides as follows. As shown in Fig. 1, the plates 15 and 16 are provided at their edge portions remote from the bars 10 and 11, with slots 23, 23 and 24, 24 respectively, in which vertical studs 25, 25 and 26, 26 are supported, vertical rollers 27, 27 and 28, 28 being respectively mounted for free rotary movement on said studs. Each of the said vertical studs is supported on its mounting plate, as illustrated for one of the studs 26 in Fig. 4, in which figure said stud is shown as shouldered near its lower end to rest on a washer 26a supported on the plate 16, said stud being of reduced diameter below said shoulder and threaded to engage a nut 26b below the plate 16, which nut is shouldered and provided with opposite flat faces extending with a sliding fit into the slot 24, to prevent turning movement of said nut. The stud 26 is slotted at its upper end at 26c to facilitate loosening said stud in the nut 26b, and also the clamping of the washer 26a and the nut 26b against the plate as desired. In this way the stud may be given any desired position longitudinally of its slot 24, and clamped in that position. The roller 28 is mounted for free rotation on the stud 26, and it and said stud may be removed from the plate 16 when it is not desired to use the roller.

The vertical rollers described provide a means for limiting as desired, the extent of the flat filed surfaces on the work, determined by the rollers 19 and 20, and they also determine vertical surfaces that may be filed flat and true across the upper portion of the piece of work being filed, which vertical surfaces make vertical angles with the filed surface determined by the rollers 19 and 20 for the same clamped position of the piece of work, that are right angles; it will also be noted that said vertical surfaces may make horizontal angles with the clamping faces of the bars 10 and 11, that are acute angles, right angles or obtuse angles, depending on the location of the several vertical studs in their slots.

As shown in Figs. 2 and 3, the clamping bar 10 is provided at each end with upper and lower extensions 10a, supporting vertical screws 29, 29, said screws being grooved near their lower ends to receive pins 30, 30 holding said screws against longitudinal movement, without interfering with rotating them. The screws 29, 29 extend with threaded engagement through work rests or supports 31, 31, which as shown in Fig. 3, extend horizontally from said screws towards the clamping plate 11, said work supports having flat, sliding engagement with the ends of the bar 10 to prevent turning movement of said work supports, without interfering with their movement vertically by rotation of said screws. The ends of the clamping bar 11 are formed to clear the work supports 31, 31 when the clamping bars are brought close together, and the lower ends of the screws 29, 29 are provided with knurled heads 29a, 29a, below the bar 10, by which said screws may be rotated to adjust the work supports 31, 31 vertically. The distance from the plane of the top surfaces of the rollers 19 and 20 to the top faces of the work supports 31, 31, is equal to the thickness of the piece of work being filed, after its upper filed surface has been completed, between the lower surface of said work then resting upon said supports, and said upper filed surface, and said upper and lower surfaces may be either parallel or at an angle to each other according to whether said work supports 31, 31 are placed the same or different distances below the plane of the tops of the rollers 19 and 20. Where the piece of work is shorter than the distance between the work supports 31, 31, it may still be supported by said supports with all of the advantages described, by first placing on said work supports a straight supporting bar spanning said supports, and then placing the work on said supporting bar.

As shown in Fig. 3, the filing fixture may be conveniently used in connection with a machinists' vise, by placing the clamping bars 10 and 11 against the jaws 32 and 33 of such a vise, the operating mechanism of said vise not being shown as it may be of any kind known in the art, or, if preferred, any other convenient clamp may be employed to hold the clamping bars 10 and 11 of the fixture, tightly against the work being filed.

The clamping bars and rollers of the fixture are preferably made of hardened steel, to maintain accuracy of the clamping faces and to prevent wear of the surfaces of the rollers due to their rolling on the file or abrasive tool employed.

The fixture described is effective in filing accurate flat surfaces on many kinds of articles, and it possesses advantages even for the experienced workman, in permitting him to make such accurate flat surfaces more quickly than could be done without the aid of a filing guide or fixture.

While we have shown our invention in the particular embodiment above described, we do not limit ourselves thereto, as we may employ equivalents of the structures shown, without departing from the scope of the appended claims.

What we claim is:

1. In a device of the class described, the combination of two clamping bars, guide rods holding said bars with their clamping faces in parallel relation and movable towards and from each other, a horizontally disposed cylindrical roller mounted for rotation on each of said bars, the upper surfaces of said rollers being in a plane at right angles to the planes of the clamping faces of said bars and above said bars, vertical screws carried by said device for angular movement and restrained from vertical movement relatively to said rollers, and horizontal work supports having threaded engagement with said screws and extending across the space between said bars for the separated condition of the latter to support work between said bars.

2. In a device of the class described, the combination of two clamping bars, guide rods holding said bars with their clamping faces in parallel relation and movable towards and from each other, a horizontally disposed cylindrical roller mounted for rotation on each of said bars, the upper surfaces of said rollers being in a plane at right angles to the planes of the clamping faces of said bars and above said bars, and vertically disposed cylindrical rollers carried by said bars with their axes substantially perpendicular to the plane of the top surfaces of said horizontally disposed rollers, said vertically disposed rollers having adjustable support and movable longitudinally of said bars to change as desired the horizontal angle between the vertical plane of said vertical roller surfaces and the clamping faces of said bars.

3. In a device of the class described, the combination of two clamping bars, guide rods holding said bars with their clamping faces in parallel relation and movable towards and from each other, a horizontally disposed cylindrical roller mounted for rotation on each of said bars, the upper surfaces of said rollers being in a plane at right angles to the planes of the clamping faces of said bars and above said bars, each of said bars having extending therefrom a horizontal and slotted member, and a plurality of vertically disposed cylindrical rollers adjustably mounted on each of said members by the slots therein, whereby the plane of each two of said vertically disposed rollers, one for each of said members, may be adjusted to a desired horizontal angle independently of the others of said vertically disposed rollers.

4. In a device of the class described, the combination of two clamping bars, guide rods holding said bars with their clamping faces in parallel relation and movable towards and from each other, a horizontally disposed cylindrical roller mounted for rotation on each of said bars, the upper surfaces of said rollers being in a plane at right angles to the planes of the clamping faces of said bars and above said bars, each of said bars having extending therefrom a horizontal and slotted member, a plurality of vertically disposed cylindrical rollers adjustably mounted on each of said members by the slots therein, whereby the plane of each two of said vertically disposed rollers, one for each of said members, may be adjusted to a desired horizontal angle independently of the others of said vertically disposed rollers, a vertical stud supporting each of said vertically disposed rollers for free angular movement thereon, said stud being shouldered and threaded at its lower end and extending through one of said slots, and a nut on the lower end of said stud for clamping said stud tightly in adjusted position.

5. In a device of the class described, the combination of two clamping bars, guide rods holding said bars with their clamping faces in parallel relation and movable towards and from each other, a horizontally disposed cylindrical roller mounted for rotation on each of said bars, the upper surfaces of said rollers being in a plane at right angles to the planes of the clamping faces of said bars and above said bars, each of said bars having extending therefrom a horizontal and slotted member, a plurality of vertically disposed cylindrical rollers adjustably mounted on each of said members by the slots therein, whereby the plane of each two of said vertically disposed rollers, one for each of said members, may be adjusted to a desired horizontal angle independently of the others of said vertically disposed rollers, a vertical stud supporting each of said vertically disposed rollers for free angular movement thereon, said stud being shouldered and threaded at its lower end and extending through one of said slots, and a nut on the lower end of said stud for clamping said stud tightly in adjusted position, said nut having a flat sided extension entering the slot containing the threaded end of said stud to prevent angular movement of said nut.

6. In a device of the class described, the combination of two clamping bars, guide rods holding said bars with their clamping faces in parallel relation and movable towards and from each other, a horizontally disposed cylindrical roller mounted for rotation on each of said bars, the upper surfaces of said rollers being in a plane at right angles to the planes of the clamping faces of said bars and above said bars, vertically disposed cylindrical rollers carried by said bars with their axes substantially perpendicular to the plane of the top surfaces of said horizontally disposed rollers, vertical screws carried by said device for angular movement and restrained from vertical movement relatively to said rollers, and horizontal work supports having threaded engagement with said screws and extending across the space between said bars for the separated condition of the latter to support work between said bars.

7. In a device of the class described, the combination of two clamping bars, guide rods holding said bars with their clamping faces in parallel relation and movable towards and from each other, a horizontally disposed cylindrical roller mounted for rotation on each of said bars, the upper surfaces of said rollers being in a plane at right angles to the planes of the clamping faces of said bars and above said bars, vertically disposed cylindrical rollers carried by said bars with their axes substantially perpendicular to the plane of the top surfaces of said horizontally disposed rollers, said vertically disposed rollers having adjustable support and movable longitudinally of said bars to change as desired the horizontal angle between the vertical plane of said vertical roller surfaces and the clamping faces of said bars, vertical screws carried by said device for angular movement and restrained from vertical movement relatively to said rollers, and horizontal work supports having threaded engagement with said screws and extending across the space between said bars for the separated condition of the latter to support work between said bars.

8. In a device of the class described, the combination of two clamping bars, guide rods holding said bars with their clamping faces in parallel relation and movable towards and from each other, a horizontally disposed cylindrical roller mounted for rotation on each of said bars, the upper surfaces of said rollers being in a plane at right angles to the planes of the clamping faces of said bars and above said bars, a vertical screw carried by each end of one of said bars adjacent the end surface of the latter, a horizontal work support having threaded engagement with each of said screws and extending towards the other of said bars and engaging the end surface adjacent the corresponding screw and restraining the work support against angular movement, and means restraining each of said screws against longitudinal movement.

9. In a device of the class described, the combination of two clamping bars, guide rods holding said bars with their clamping faces in parallel relation and movable towards and from each other, a horizontally disposed cylindrical roller mounted for rotation on each of said bars, the upper surfaces of said rollers being in a plane at right angles to the planes of the clamping faces of said bars and above said bars, each of said bars having extending therefrom a horizontal and slotted member, a plurality of vertically disposed cylindrical rollers adjustably mounted on each of said members by the slots therein, whereby the plane of each two of said vertically disposed rollers, one for each of said members, may be adjusted to a desired horizontal angle independently of the others of said vertically disposed rollers, a vertical screw carried by each end of one of said bars adjacent the end surface of the latter, a horizontal work support having threaded engagement with each of said screws and extending towards the other of said bars and engaging the end surface adjacent the corresponding screw and restraining the work support against angular movement, and means restraining each of said screws against longitudinal movement.

10. In a device of the class described, the combination of two clamping bars, guide rods holding said bars with their clamping faces in parallel relation and movable towards and from each other, a horizontally disposed cylindrical roller mounted for rotation on each of said bars, the upper surfaces of said rollers being in a plane at right angles to the planes of the clamping faces of said bars and above said bars, each of said bars having extending therefrom a horizontal and slotted member, a plurality of vertically disposed cylindrical rollers adjustably mounted on each of said members by the slots therein, whereby the plane of each two of said vertically disposed rollers, one for each of said members, may be adjusted to a desired horizontal angle independently of the others of said vertically disposed rollers, a vertical stud supporting each of said vertically disposed rollers for free angular movement thereon, said stud being shouldered and threaded at its lower end and extending through one of said slots, and a nut on the lower end of said stud for clamping said stud tightly in adjusted position, a vertical screw carried by each end of one of said bars adjacent the end surface of the latter, a horizontal work support having threaded engagement with each of said screws and extending towards the other of said bars and engaging the end surface adjacent the corresponding screw and restraining the work support against angular movement, and means restraining each of said screws against longitudinal movement.

11. In a device of the class described, the combination of two clamping bars, guide rods holding said bars with their clamping faces in parallel relation and movable towards and from each other, a horizontally disposed cylindrical roller mounted for rotation on each of said bars, the upper surfaces of said rollers being in a plane at right angles to the planes of the clamping faces of said bars and above said bars, each of said bars having extending therefrom a horizontal and slotted member, and a plurality of vertically disposed cylindrical rollers adjustably mounted on each of said members by the slots therein, whereby the plane of each two of said vertically disposed rollers, one for each of said members, may be adjusted to a desired horizontal angle independently of the others of said vertically disposed rollers, said rollers having hardened surfaces protecting said rollers from abrasion by a file rolling on them.

VERN J. CRISLER.
WALTER J. FRIEDLAND.